April 26, 1927.
J. G. CAMPBELL
1,626,182
ELECTRICAL APPARATUS
Filed Feb. 24, 1923      2 Sheets-Sheet 2
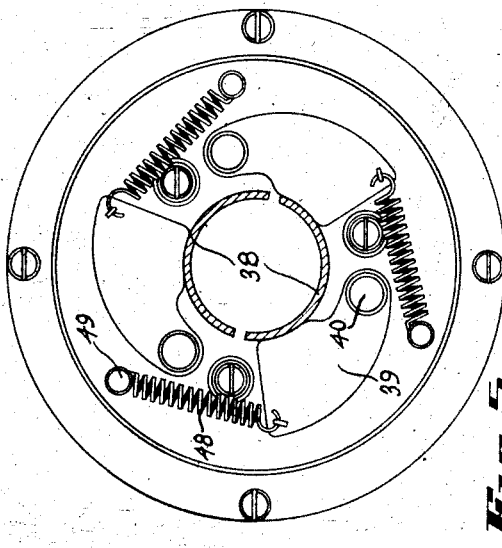
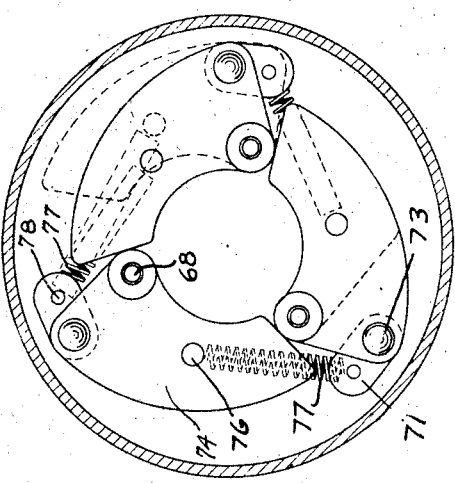
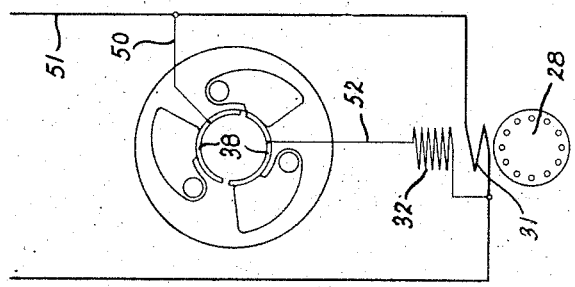
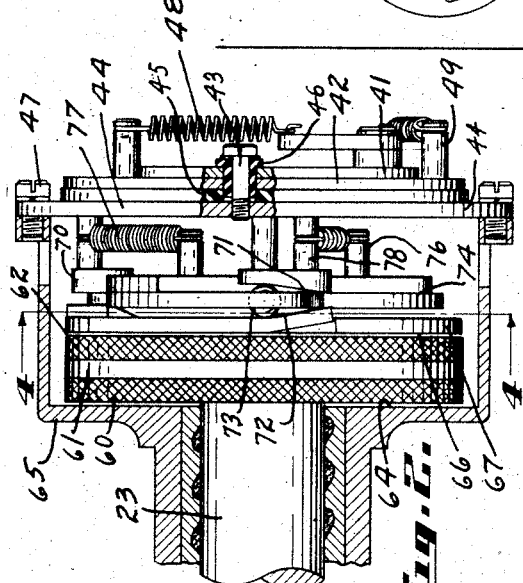
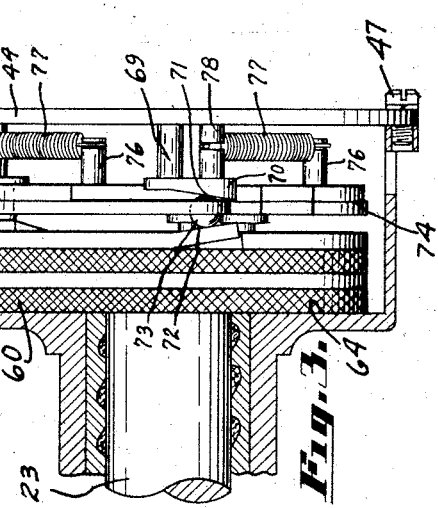
Witnesses
Charles E. Greene
Lloyd M. Keighley
Inventor
John G. Campbell
By J. Ralph Fehr
His Attorney Patented Apr. 26, 1927.

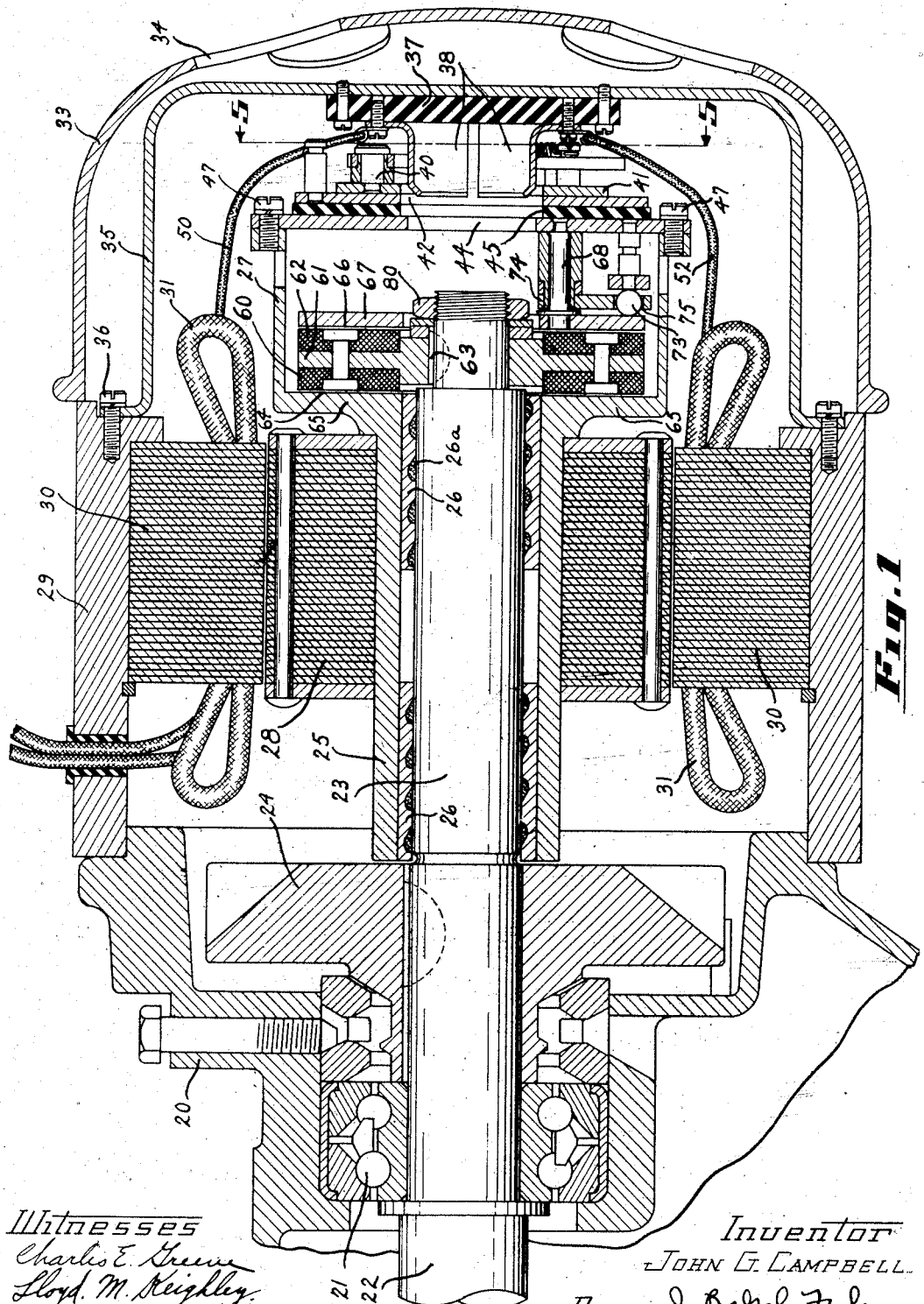

1,626,182

UNITED STATES PATENT OFFICE.

JOHN G. CAMPBELL, OF DAYTON, OHIO, ASSIGNOR TO DELCO-LIGHT COMPANY, OF DAYTON, OHIO, A CORPORATION OF DELAWARE.

ELECTRICAL APPARATUS.

Application filed February 24, 1923. Serial No. 621,093.

This invention relates to alternating current motors, and more particularly the type of motor which should be brought up to synchronous speed before the motor drives a machine.

This invention has among its objects to provide improved means connecting the rotor of the motor with a driven shaft after a certain rotor speed has been obtained. Another object is to provide improved means for rendering inoperative, after the motor has been brought up to a certain speed, an auxiliary circuit which is used in starting the motor.

Other and further objects and advantages of the present invention will be apparent from the following description of a preferred form thereof, reference being made to the accompanying drawings.

In the drawings:

Fig. 1 is a longitudinal sectional view of a motor including the present invention together with a fragmentary sectional view of a machine frame with which the motor is associated;

Fig. 2 is a side elevation partly in section showing the motor clutch in disengaged position;

Fig. 3 is a view similar to Fig. 2 showing the clutch in engaged position;

Fig. 4 is a sectional view taken on the line 4—4 of Fig. 2;

Fig. 5 is a sectional view taken on the line 5—5 of Fig. 1; and

Fig. 6 is a wiring diagram of the electrical circuits of the motor.

This invention contemplates mounting the rotor of the motor loosely upon a portion of the operating shaft of a machine upon which the motor is preferably mounted. The speed responsive circuit controlling mechanism and the speed responsive clutch are both located adjacent an exposed end of the motor, and both the mechanisms are readily removable from the motor without necessitating removal of the motor from the machine.

In the drawings, 20 indicates a fragment of a machine frame having bearings, one of which is shown at 21, for supporting a main or operating shaft 22 having a portion 23 extending beyond the bearing 21 and outside of the machine frame. The portion 23 supports a flywheel 24, and journalled thereupon, is a rotor sleeve 25 having bearing bushings 26 and a cup-shaped outer end 27. Sleeve 25 supports the motor rotor 28 which is of the squirrel-cage type and revolves within a motor field comprising a shell 29 attached to the frame 20, laminated field poles 30 and field windings 31 and 32. Windings 31 constitute the main windings of the motor field, and windings 32 constitute the auxiliary or starting field windings which are used to bring the motor from its state of rest up to synchronous speed. The frame 20 constitutes an end frame for the field frame 29, the exposed end of which is enclosed by a removable cover 33 having ventilating openings 34.

Within the cover 33 there is located a switch bracket 35 attached to frame 29 by screws 36. Bracket 35 carries a non-conducting switch base 37 upon which are mounted two semi-cylindrical switch contacts 38 which together present a cylindrical surface adapted to be connected together by weight members 39 pivoted at 40 upon a weight plate 41 which along with plate 42 is attached by means of screws 43 to a mounting plate 44, but insulated from plate 44 by means of non-conducting washer 45 and bushings 46. Plate 44 is attached to the cup-shaped end 27 of sleeve 25 by means of screws 47. Each spring 48 is attached at one end to a weight member 39 and at the other to a stud 49 riveted to the plate 42. One of the switch contacts 38 is connected by wire 50 with one of the motor leads 51 (see Fig. 6) and the other contact 38 is connected by wire 52 with the starting field winding 32. The springs 48 hold the weights 39 in contact with one or more of the contacts 38 so that the contacts 38 are connected together by means of a circuit through the weights 39 and the plate 41.

When the motor leads are connected with a source of alternating current, the squirrel-cage rotor 28 will be brought from a state of rest to synchronous speed with the aid of the auxiliary starting field 32. When a certain speed of the rotor has been reached, the weights 39 will move outwardly away from the contacts 38 and interrupt the auxiliary field circuit 32. The motor may now be connected with the machine to be driven by it through the clutch mechanism which will now be described.

The motor clutch comprises friction discs 60 and 62 of any suitable flexible or other friction material secured upon opposite sides of a mounting disc 61 which is slidable along the shaft 23 and is keyed thereto by means of key 63. The members 60, 61, and 62 provide an axially slidable friction member which is adapted to be clamped between two friction surfaces, namely, the surface 64 provided on the flange 65 of the sleeve 25 and constituting an end wall of the cup 27, and the surface 66 of a disc 67 which is axially slidable with respect to the sleeve 25 and is driven thereby. Mounting plate 44 carries three studs 68 upon which the plate 67 is slidable axially. Plate 44 carries three pairs of studs 69 and 78 upon which are mounted blocks 70 provided with wedging surfaces 71 which are oblique to the axis of shaft 23. Opposite to the surfaces 71, the slidable clutch disc 67 is provided with wedging surfaces 72 which are obliquely inclined with respect to the axis of shaft 23 and with respect to the wedging surfaces 71. In order to wedge surfaces 71 and 72 apart, a ball 73 is located between each pair of surfaces 71 and 72. Each ball 73 is retained in position by a weight member 74 pivoted upon a stud 68 and provided with a hole 75 for loosely receiving the ball 73. Each weight 74 carries a stud 76 connected with a spring 77 attached at the other end to a stud 78 riveted to the mounting plate 44.

Obviously rotation of the rotor 28 causes the weights 74 to be rotated, and above a certain rotor speed centrifugal force produced by the rotating weights will overcome the spring 77 and will cause the weights 74 to move outwardly. Each ball 73 will move into the narrower portion of the space between the inclined wedging surfaces 71 and 72, causing the clutch plate 67 to be wedged away from the blocks 70 in a direction to the left as viewed in Fig. 1. Plate 67 will therefore engage the friction disc 62 and will cause the disc 60 to be forced against the friction surface 64. In this manner the driven portion of the friction clutch will be clamped between two driving portions carried by the motor rotor sleeve 25. When the motor comes to rest, the weight members 39 and 74 will return to their respective positions shown in Figs. 4 and 5, allowing the friction discs 60 and 62 to run free of the driving clutch members 65 and 67, and causing a circuit to be made between the switch contacts 38.

By virtue of the construction which has been described, the speed responsive switch and clutch can be mounted at one end of a motor and may be disassembled from the motor without disturbing other parts thereof. Consequently the motor is adapted to be mounted upon a machine frame with the machine frame serving as a closure for one end of the motor field frame, and the motor rotor can be mounted upon an end of the machine operating shaft which extends through and overhangs a portion of the machine frame. Such a motor and machine assembly is shown in the copending application of Kettering and Buvinger, Serial No. 299,195, filed May 23, 1919, which discloses a motor driven pump. In a motor and machine unit of this type, the bearings of the machine operating shaft are arranged to support the shaft with an overhanging portion thereof carrying the motor rotor. Therefore no additional bearings and bearing supports are required for the motor.

To disassemble the switch and clutch, the cover 33 is first removed and then the switch bracket 35 carrying with it the contacts 38. Then screws 47 are removed and mounting plate 44 removed, thereby removing both sets of weight elements. The clutch located within the cup 27 is now exposed. By removing nut 80, threaded on the end of shaft 23, the clutch elements 61 and 67 can be removed, and then the sleeve 25 carrying with it the rotor 28.

Since the sleeve 25 turns with respect to the shaft 23 only during the starting period of the motor, the bushings 26 are provided with grooves 26ª for receiving grease or other non-fluid lubricant; and one greasing of these bushings 26 will supply lubrication to the shaft 23 for a considerable period.

While the form of mechanism herein shown and described constitutes a preferred embodiment of one form of invention, it is to be understood that other forms might be adopted and various changes and alternations made in the shape, size, and proportion of the elements therein without departing from the spirit and scope of the invention.

What is claimed is as follows:

1. In an electric motor, the combination with a motor frame including a bearing, a shaft journalled in said bearing and overhanging the bearing, and a rotor mounted on the overhanging portion of the shaft and rotatable with respect to the shaft; a speed responsive clutch actuated by the rotor to connect the rotor and shaft; a speed responsive switch for controlling a motor circuit; and means supported by the rotor adjacent the free end of the shaft for supporting elements of the clutch and switch.

2. In an electric motor, the combination with a shaft and a rotor mounted for movement relative to the shaft; a speed responsive clutch for connecting the rotor and shaft; a speed responsive switch for controlling a motor circuit, said clutch and switch each having centrifugally-operated elements disposed at one end of the shaft, and means supported by the rotor adjacent said end of the shaft for supporting said elements of the clutch and switch.

3. In an electric motor, the combination with a shaft and a rotor mounted for movement relative to the shaft; a speed responsive clutch for connecting the rotor and shaft; a speed responsive switch for controlling a motor circuit, said clutch and switch each having speed-responsive elements disposed adjacent one end of the shaft; and a common means connected with and located adjacent said end of the rotor for supporting said speed responsive elements of the clutch and switch.

4. In an electric motor, the combination with a shaft and a rotor mounted for movement relative to the shaft; a speed responsive clutch for connecting the rotor and the shaft; a speed responsive switch for controlling a motor circuit; and a mounted plate connected with the rotor for supporting on one side thereof the centrifugal elements of the switch, and, on the other side thereof, the centrifugal elements of the clutch.

5. In an electric motor, the combination with a shaft and a rotor mounted for movement relative to the shaft; a speed responsive clutch for connecting the rotor and shaft, and including a weight element pivotally mounted to swing transverse to the shaft; a speed responsive switch for controlling a motor circuit and including a weight element pivotally mounted to swing transverse to the shaft; and a plate connected with the rotor for supporting said weights on opposite sides thereof.

In testimony whereof I hereto affix my signature.

JOHN G. CAMPBELL.